United States Patent Office 3,282,991
Patented Nov. 1, 1966

3,282,991
ALKYLDICHLOROBENZOIC ACIDS
David X. Klein, Montclair, and Theodore A. Girard, Wayne Township, Passaic County, N.J., assignors to Tenneco Chemicals, Inc., formerly Heyden Newport Chemical Corporation, New York, N.Y., a corporation of Delaware
No Drawing. Filed Oct. 29, 1963, Ser. No. 319,703
12 Claims. (Cl. 260—501)

This application is a continuation-in-part of our copending application Serial No. 714,030, now abandoned, filed February 10, 1958, and our copending application Serial No. 203,485, filed June 19, 1962, now Patent No. 3,236,623 which is a continuation-in-part of said application Serial No. 714,030.

The present invention relates to novel compounds and the production of such compounds.

In accordance with this invention it has been discovered that certain monoalkyldichlorobenzoic acids have unusual and valuable activity as herbicides and particularly as selective herbicides. These compounds may be applied to soil or other medium normally supporting plant growth or to existing plants to inhibit or control the growth of plants. They may be applied to an area containing a crop to prevent the growth of weeds therein, or they may be applied to an area to keep it free from all plant growth.

The herbicidal monoalkyldichlorobenzoic acids have the formula

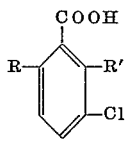

in which one of the symbols R and R' is a chlorine atom and the other is an alkyl group containing from 1 to 4 carbon atoms. These compounds include, for example, 2-methyl-3,6-dichlorobenzoic acid, 2-propyl-3,6-dichlorobenzoic acid, 2-butyl-3,6-dichlorobenzoic acid, 2,3-dichloro-6-methylbenzoic acid, and 2,3-dichloro-6-butylbenzoic acid. Esters, salts, and amides of these acids also have herbicidal activity.

The herbicidal monoalkyldichlorobenzoic acids may be applied as such to plants or to the soil, or they may be applied in the form of compounds that under the conditions of use yield the acids. Thus, they may be applied as salts, esters, or amides that will yield the acids on contact with soil or plant moisture as is well known in the art with regard to organic acid herbicides. Accordingly, hydrolyzable salts, esters, and amides are obvious equivalents of the acids.

While any of the metal, ammonium, and amine salts of the acids may be used as herbicides, the most effective are the alkali metal and alkaline earth metal salts, for example, the sodium, potassium, lithium, calcium, and barium salts; the ammonium salt; and the mono- and dialkylamine and alkanolamine salts in which the alkyl and alkanol groups contain from 1 to 4 carbon atoms, for example, the dimethylamine, monobutylamine, diethanolamine, monomethanolamine, and dibutanolamine salts. The herbicides may also be used in the form of esters. Alcohols that may be reacted with the acids to form herbicidal esters include alkanols containing from 1 to 6 carbon atoms, monohydric ether alcohols, and alkylene glycols containing from 2 to 6 carbon atoms. Illustrative of these alcohols are methanol, ethanol, propanol, butanol, hexanols, ethylene glycol, propylene glycol, diethylene glycol, triethylene glycol, ethylene glycol monomethyl ether, ethylene glycol monobutyl ether, and diethylene glycol monoethyl ether. Amides of the acids, for example, 2,3,6-monoalkyldichlorobenzamides, N,N-dimethyl-2,3,6 - monoalkyldichlorobenzamides, N,N - diisopropyl-2,3,6-monoalkyldichlorobenzamides, and N-n-butyl-2,3,6-monoalkyldichlorobenzamides, may be used. These derivatives may be prepared by methods that are well known to those skilled in the art.

While the herbicidally-active products may be applied as such for the control of weeds and in the sterilization of soil with regard to plant growth, they are ordinarily and preferably used in combination with an inert diluent or carrier to make it easier to measure accurately and to apply evenly the small amounts of the herbicides that are required to control plant growth as well as to apply them in the form that will be readily dispersed through the soil and/or absorbed by the plants. Those compounds that are sufficiently soluble in water, such as the alkali metal and ammonium salts, can be formulated into sprayable compositions by dissolving them in water. Alternatively, the compounds may be mixed with or deposited upon an inert finely-divided solid carrier, such as natural clays, diatomaceous earth, silica, walnut shell flour, and the like, and employed as dusts. Such mixtures may also be dispersed in water with or without the aid of a wetting agent and the resulting aqueous dispersions employed as sprays. Herbicidal granules or pellets are often used when the application is primarily to the soil. Pellets may be made by extruding moistened, powdered mixtures of the herbicide and a powdered inert diluent under high pressure through dies. Granules may be prepared by impregnating granular carriers, such as granular clays, or by granulating mixtures of the herbicide and a powdered inert diluent. The herbicidal compounds may also be used as the active constituents in ketone, ether, alcohol, or hydrocarbon solutions or in oil-in-water emulsions.

The concentration of the herbicidal compound in the composition may vary widely and depends upon a number of factors, the most important of which are the amount of composition to be applied per unit of area and the type or types of plants being treated. In most cases the herbicidal compounds are applied in the form of sprays, dusts, or granules that contain from approximately 0.1% to 80% by weight of the active component. Two or more of the herbicidal compounds of the present invention may be present in the compositions; if desired, other herbicidal compounds may also be present.

The monoalkyldichlorobenzoic acids of the present invention may be prepared by any convenient process. For example, 2,3-dichloro-6-methylbenzoic acid and 2-methyl-3,6-dichlorobenzoic acid may be prepared by a process which involves the nuclear dichlorination of o-xylene, the side-chain chlorination of the dichloro-o-xylene to form methyldichlorobenzyl chloride, and the reaction of the methyldichlorobenzyl chloride with an alkali metal salt of a saturated monocarboxylic acid to form a methyldichlorobenzyl ester which is then oxidized to methyldichlorobenzoic acid. The product of this process is a mixture containing at least 60% of methyldichlorobenzoic acid and small amounts of methylmonochlorobenzoic acid, methyltrichlorobenzoic acid, and methyltetrachlorobenzoic acid. The methyldichlorobenzoic acids may be separated from the other products of the reaction, for example, by fractional distillation, or the mixture of methylchlorobenzoic acids may be used in the herbicidal compositions.

The methyldichlorobenzoic acid fraction resulting from the aforementioned procedure is a mixture of isomers containing approximately 50% to 90% of isomers having a chlorine atom in the 3-position and a methyl group and a chlorine atom in the 2- and 6-positions of the aromatic nucleus, that is, 2-methyl-3,6-dichlorobenzoic acid and 2,3-dichloro-6-methylbenzoic acid. Smaller amounts of the other isomers, for example, 2-methyl-3,4-dichlorobenzoic acid, 2-methyl-4,5-dichlorobenzoic acid, and 2-methyl-5,6-dichlorobenzoic acid, may also be present. The relative amounts of 2-methyl-3,6-dichlorobenzoic acid and 2,3-dichloro-6-methylbenzoic acid that are present in the mixture of methyldichlorobenzoic acid isomers may vary widely. In most cases approximately 0.1 part to 10 parts by weight of 2,3-dichloro-6-methylbenzoic acid are present for each part by weight of 2-methyl-3,6-dichlorobenzoic acid.

The present invention is further illustrated by the examples that follow. It is to be understood, however, that these examples are not to be construed as being limitative, but are furnished merely for purposes of illustration.

*Example 1*

A mixture of isomeric methyldichlorobenzoic acids containing 2,3-dichloro-6-methylbenzoic acid and 2-methyl-3,6-dichlorobenzoic acid was prepared by the following procedure:

Gaseous chlorine was bubbled through a mixture of 500 g. of o-xylene and 5 g. of iron filings at $-15°$ to $-10°$ C. for 5 hours. At the end of this time the weight of the mixture had increased by 323 g. The chlorinated o-xylene mixture was washed with five 1000 ml. portions of water and then distilled under reduced pressure. The dichloro-o-xylene fraction, which boiled at $104°–108°$ C./12–14 mm., weighed 331.3 grams and contained 40.11% Cl (calculated for dichloroxylene, 40.6% Cl).

Two hundred grams of this dichloro-o-xylene was chlorinated at $205°–210°$ C. for three hours. At the end of this time the weight of the reaction mixture had been increased by 39 grams, the calculated weight increse for the addition of one gram atom of chlorine per gram molecular weight of dichloro-o-xylene.

The methyldichlorobenzyl chloride resulting from the above-described side-chain chlorination was heated with 118.3 grams of sodium formate and 600 ml. of acetic acid at reflux temperature for 8 hours. Following removal of the acetic acid by distillation under reduced pressure and washing of the product with 500 ml. of water, 215.4 g. of crude methyldichlorobenzyl formate was obtained. Oxidation to the corresponding acid was accomplished by heating 105 g. of the ester with 617.5 g. of 70% nitric acid at reflux temperature for three hours. The oxidation product was cooled, poured into 1000 ml. of water, and then extracted with three 300 ml. portions of benzene. The combined benzene extracts were extracted with 410 g. of a 5% sodium hydroxide solution. After the addition of 15 ml. of 36% hydrochloric acid, the sodium hydroxide extract was treated with 3 g. of activated carbon and filtered. The filtrate was acidified with 100 g. of 36% hydrochloric acid, and the precipitated product was isolated by filtration and dried at $55°–60°$ C. Approximately 58 g. was obtained of a product which was a mixture of isomeric methyldichlorobenzoic acids containing major amounts of the 2,3-dichloro-6-methyl isomer and the 2-methyl-3,6-dichloro isomer and minor amounts of the 2-methyl-3,4-dichloro isomer and the 2-methyl-4,5-dichloroisomer.

*Example 2*

Seventy-five grams of a mixture of isomeric methyldichlorobenzoic acids prepared by the procedure described in Example 1 was heated at its reflux temperature for 8 hours with 750 ml. of methanol and 20 ml. of concentrated sulfuric acid. Following the removal of unreacted methanol by distillation under reduced pressure, the residue was dissolved in benzene. This solution was washed with water and was then extracted with 320 ml. of a 5% sodium hydroxide solution. The alkaline extract was treated with activated carbon at $50°$ C., filtered, cooled to $20°$ C., and acidified with 36% hydrochloric acid. The precipitated acid was isolated by filtration and then recrystallized twice from cyclohexane, twice from ligroin, and then from nitroethane. The purified 2,3-dichloro-6-methylbenzoic acid resulting from this procedure had a melting point of $91°–92°$ C. and an acid number of 274 (calculated for $C_8H_6O_2Cl_2$, Acid No. 274).

The benzene solution of methyl esters of methyldichlorobenzoic acid isomers not having a chlorine atom ortho to the carboxy groups of the acid and from which the methyldichlorobenzoic acids, each having a chlorine atom ortho to the carboxyl group, had been extracted was evaporated to dryness. The residue was heated with 11.8 g. of sodium hydroxide, 23.6 g. of water, and 200 ml. of ethanol at reflux temperature for 8 hours. Following the removal of ethanol and water by distillation under reduced pressure, the residue was dissolved in water and the resulting solution was clarified by filtration, acidified to pH 1, and again filtered. After being dried at $55°–60°$ C., the product, which contained 2-methyl-3,4-dichlorobenzoic acid and 2-methyl-4,5-dichlorobenzoic acid, was purified by recrystallization from benzene. The components of this mixture were then separated from fractional distillation.

*Example 3*

In this series of tests, groups of flats containing soil were planted with rape, lambs quarters, alfalfa, vetch, and timothy seeds, respectively. Each flat contained seeds of one kind and was treated with one herbicide at one dosage. The herbicide was applied in the form of a dilute aqueous solution of sodium 2,3-dichloro-6-methylbenzoate. The amount of solution used was such as to apply the amount of the sodium salt equivalent to the amount of 2,3-dichloro-6-methylbenzoic acid set forth under "Dosage" in Table I. For comparative purposes flats in each group were treated with aqueous solutions containing the sodium salt of "2,4-D" (2,4-dichlorophenoxyacetic acid). In each case the herbicide was applied to the soil in the flats on the same day that the seeds were planted. The results of the tests, which were observed ten days after planting, are given in Table I.

In tables I and II the letters "D," "S," and "I" refer to density of the plants, size of the plants, and injury to the plants, respectively. The effectiveness of the herbicides, as determined by comparison with untreated plantings, is indicated in the tables by the numbers "0" through "100" in increasing order of effectiveness. Thus "0" indicates no herbicidal activity and "100" maximum activity (complete kill).

TABLE I.—ACTIVITY OF 2,3-DICHLORO-6-METHYLBENZOIC ACID AS A PRE-EMERGENCE HERBICIDE

| Plant Species | Dosage, Lbs./Acre | 2,3-dichloro-6-methylbenzoic acid | | | 2,4-D | | |
|---|---|---|---|---|---|---|---|
| | | D | S | I | D | S | I |
| Rape | 0.25 | 20 | 60 | 40 | 0 | 20 | 20 |
| | 0.5 | 40 | 60 | 40 | 20 | 60 | 20 |
| | 1.0 | 60 | 80 | 60 | 60 | 60 | 20 |
| | 2.0 | 80 | 100 | 100 | 80 | 80 | 80 |
| Lambsquarters | 0.25 | 0 | 40 | 20 | 0 | 0 | 20 |
| | 0.5 | 20 | 60 | 40 | 0 | 0 | 20 |
| | 1.0 | 20 | 60 | 60 | 0 | 40 | 20 |
| | 2.0 | 60 | 60 | 60 | 40 | 40 | 40 |
| Alfalfa | 0.25 | 0 | 40 | 20 | 0 | 20 | 20 |
| | 0.5 | 20 | 80 | 60 | 20 | 60 | 40 |
| | 1.0 | 60 | 80 | 80 | 40 | 80 | 80 |
| | 2.0 | 60 | 80 | 80 | 60 | 80 | 80 |
| Vetch | 0.25 | 20 | 40 | 60 | 0 | 0 | 20 |
| | 0.5 | 40 | 60 | 60 | 20 | 20 | 40 |
| | 1.0 | 60 | 60 | 80 | 40 | 40 | 60 |
| | 2.0 | 80 | 60 | 80 | 60 | 60 | 60 |
| Timothy | 0.25 | 20 | 60 | 40 | 0 | 20 | 0 |
| | 0.5 | 40 | 60 | 40 | 20 | 40 | 20 |
| | 1.0 | 40 | 60 | 60 | 40 | 40 | 20 |
| | 2.0 | 80 | 80 | 80 | 60 | 60 | 60 |

From the data in Table I it can be seen that 2,3-dichloro-6-methylbenzoic acid is more effective as a herbicide than is 2,4-D when applied before the emergence of both dicotyledonous plants (rape, lambs-quarters, alfalfa, and vetch) and monocotyledonous plants (timothy.)

Example 4

Groups of flats containing soil were planted with rape, lambsquarter, millet, and timothy seeds, respectively. Each flat contained seeds of one kind and was treated with one herbicide at one dosage. The herbicides were applied in the form of dilute aqueous solutions of their sodium salts with the quantity of solution used being such as to apply the amount of salt equivalent to the amount of acid indicated in the "Dosage" column. The solutions were applied to the soil in the flats on the day the seeds were planted. The results, which were observed the stated number of days after planting, are summarized in Table II.

Example 5

A series of experiments was carried out in which the post-emergence herbicidal activity of the product of Example 1 was compared to that of certain other methyldichlorobenzoic acid isomers. In these tests a group of flats containing rape seedlings was sprayed with aqueous solutions of the sodium salts of the acids at dosages ranging from 0.5 pound to 16 pounds per acre, these dosages indicating the equivalent amount of acid applied as the salt. The results of the tests were observed 43 days after application of the test materials. The effects observed at this time are summarized in Table III.

TABLE III.—ACTIVITY OF METHYLDICHLOROBENZOIC ACIDS AS POST-EMERGENCE HERBICIDES

| Dosage, Lb./Acre | Product of Example 1 | | | | 3,5-dichloro-4-methylbenzoic Acid | | | | 4,6-dichloro-2-methylbenzoic Acid | | | |
|---|---|---|---|---|---|---|---|---|---|---|---|---|
| | Percent Plants Killed | $S^1$ | $G^2$ | $L^3$ | Percent Plants Killed | $S^1$ | $G^2$ | $L^3$ | Percent Plants Killed | $S^1$ | $G^2$ | $L^3$ |
| 0.5 | 0 | 0 | 20 | 40 | 0 | 0 | 0 | 0 | 0 | 0 | 0 | 0 |
| 1.0 | 10 | 0 | 40 | 40 | 0 | 0 | 0 | 0 | 0 | 0 | 0 | 0 |
| 2.0 | 50 | 40 | 80 | 60 | 0 | 0 | 0 | 0 | 0 | 0 | 0 | 0 |
| 4.0 | 95 | 60 | 100 | 80 | 0 | 0 | 0 | 0 | 0 | 20 | 0 | 0 |
| 8.0 | 100 | | | | 0 | 0 | 0 | 0 | 0 | 20 | 0 | 0 |
| 16.0 | 100 | | | | 0 | 0 | 0 | 0 | 0 | 40 | 0 | 0 |

[1] S degree of reduction of size.
[2] G degree of galling.
[3] L degree of attenuation (narrowing and folding of secondary leaves).

From the data in Table III it will be seen that the product of Example 1 killed all of the plants at 8 and 16 pounds per acre and substantial numbers of plants at 2

TABLE II.—ACTIVITY OF METHYLDICHLOROBENZOIC ACIDS AND MIXTURES OF METHYLDICHLOROBENZOIC ACIDS AS PRE-EMERGENCE HERBICIDES

| Plant Species | Dosage, Lbs./Acre | Product of Example 1 | | | | 2,3-dichloro-6-methylbenzoic acid | | | | 2-methyl-4,5-dichlorobenzoic acid | | | | Mixture of 2-methyl-3,4-dichlorobenzoic acid and 2-methyl-4,5-dichlorobenzoic acid | | | |
|---|---|---|---|---|---|---|---|---|---|---|---|---|---|---|---|---|---|
| | | Days | D | S | I | Days | D | S | I | Days | D | S | I | Days | D | S | I |
| Rape | 1.0 | 19 | 60 | 80 | 80 | 24 | 60 | 80 | 60 | | | | | | | | |
| | 2.0 | 19 | 60 | 80 | 80 | 24 | 100 | 80 | 80 | 4 | 0 | 20 | 0 | 12 | 0 | 20 | 0 |
| Lambsquarters | 1.0 | 19 | 60 | 60 | 40 | 27 | 20 | 40 | 20 | | | | | | | | |
| | 2.0 | 19 | 80 | 60 | 60 | 27 | 40 | 40 | 20 | 4 | 0 | 20 | 0 | 12 | 20 | 20 | 20 |
| Timothy | 1.0 | 7 | 40 | 40 | 40 | 24 | 80 | 80 | 80 | | | | | 12 | 0 | 0 | 0 |
| | 2.0 | 7 | 80 | 80 | 60 | 24 | 100 | | | | | | | 12 | 0 | 0 | 0 |
| Millet | 1.0 | 19 | 0 | 40 | 20 | 24 | 40 | 80 | 20 | | | | | | | | |
| | 2.0 | 19 | 0 | 40 | 20 | 24 | 20 | 80 | 20 | 4 | 0 | 0 | 0 | | | | |

The data in Table II indicate that the herbicidal activity of the product of Example 1, which is a mixture of isomeric methyldichlorobenzoic acids including the 2,3-dichloro-6-methyl isomer and the 2-methyl-3,6-dichloro isomer is approximately equivalent to that of purified 2,3-dichloro-6-methylbenzoic acid. Inasmuch as the 2-methyl-4,5-dichloro isomer and the mixture of this isomer with the 2-methyl-3,4-dichloro isomer have little herbicidal activity, the mixture of isomeric acids including 2,3-dichloro-6-methylbenzoic acid and 2-methyl-3,6-dichlorobenzoic acid shows a synergistic herbicidal effect in that its activity is greater than the sum of the activities of the individual acids based on the amounts of each present in the mixture.

and 4 pounds per acre. Plants treated at 0.5 and 1 pound per acre were stunted and damaged and showed various hormonal effects. On the other hand, 3,5-dichloro-4-methylbenzoic acid showed neither hormonal nor herbicidal activity at any of the dosages applied. 4,6-dichloro-2-methylbenzoic acid caused some stunting at the higher dosages but failed to kill any of the plants.

Example 6

A series of experiments was carried out in which a mixture of methylchlorobenzoic acids was evaluated as a herbicide against a wide variety of crop plants and weeds. The methylchlorobenzoic acid mixture employed contained 0.3% of methylmonochlorobenzoic acid, 70.0% of methyldichlorobenzoic acids, 24.5% of methyltrichlorobenzoic acids, and 5.2% of methyltetrachlorobenzoic acids. The methyldichlorobenzoic acid fraction contained approximately 75% of 2-methyl-3,6-dichlorobenzoic acid and 2,3-dichloro-6-methylbenzoic acid and small amounts of 2-methyl-3,5-dichlorobenzoic acid, 2-methyl-3,4-dichlorobenzoic acid, 2-methyl-4,5-dichlorobenzoic acid, and 4-methyl-2,5-dichlorobenzoic acid.

In these tests the herbicidal mixture was applied as an aqueous solution containing an amount of the dimethylamine salts of the acids equivalent to approximately two pounds of the acids per gallon. The amount of solution used was such as to apply the amount of salt equivalent to the amount of acid indicated in the "Dosage" column. The results of these tests are given in Table IV.

TABLE IV.—HERBICIDAL ACTIVITY OF MIXTURE OF METHYLCHLOROBENZOIC ACIDS CONTAINING 2,3-DICHLORO-6-METHYLBENZOIC ACID AND 2-METHYL-3,6-DICHLOROBENZOIC ACID

| Plant Species | As Pre-Emergence Herbicide | | As Post-Emergence Herbicide | |
|---|---|---|---|---|
| | Dosage | | Dosage | |
| | 2 Lbs./Acre | 4 Lbs./Acre | 2 Lbs./Acre | 4 Lbs./Acre |
| Alfalfa | 100 | 100 | 95 | 100 |
| Birdsfoot Trefoil | 90 | 100 | 100 | 100 |
| Buckwheat | 80 | 95 | 90 | 95 |
| Cabbage | 80 | 100 | 70 | 90 |
| Castorbeans | 80 | 90 | 100 | 100 |
| Corn | 70 | 90 | 70 | 90 |
| Cotton | 100 | 100 | 100 | 100 |
| Cowpeas | 90 | 100 | 100 | 100 |
| Cucumber | 100 | 100 | 100 | 100 |
| Flax | 70 | 90 | 95 | 95 |
| Gladiolas | | | 5 | 20 |
| Lespedeza | 100 | 100 | 95 | 100 |
| Lima Beans | 95 | 95 | 90 | 95 |
| Oats | 20 | 50 | 30 | 50 |
| Peanuts | 90 | 100 | 100 | 100 |
| Peas | 50 | 90 | 100 | 100 |
| Red Clover | 100 | 100 | 100 | 100 |
| Safflower | 100 | 100 | 95 | 100 |
| Snapbeans | 95 | 100 | 95 | 95 |
| Sorghum | 80 | 90 | 50 | 70 |
| Soybeans | 100 | 100 | 100 | 100 |
| Squash | 90 | 95 | 90 | 95 |
| Sudangrass | 80 | 90 | 50 | 70 |
| Sugar Beets | 100 | 100 | 95 | 95 |
| White Clover | 100 | 100 | 95 | 100 |
| Crabgrass | 90 | 95 | 10 | 20 |
| Ryegrass | 10 | 30 | 0 | 10 |
| Other Grasses | 90 | 95 | 20 | 40 |
| Lambsquarters | 100 | 100 | 90 | 95 |
| Mustard | 90 | 100 | 95 | 95 |
| Pigweed | 100 | 100 | 90 | 95 |

*Example 7* o-Toluic acid in sulfuric acid was ring chlorinated with gaseous chlorine in the presence of iodine as a catalyst. The product was a mixture of chlorinated methylbenzoic acids and contained 45% of monochlorinated acid, 45% of dichlorinated acid, and 10% of trichlorinated acid. The mixture was partially reacted with an excess of 2-ethylhexanol at 195°–200° C. The non-esterified acid was reacted with sodium hydroxide and the water soluble sodium salts were separated from the esters. The salts were then converted back to the acids by reaction with hydrochloric acid. The esters (Fraction A) were the esters of those chlorinated acids not having a chlorine atom in a poistion ortho to the carboxyl group. The un-esterified acids (Friction B) were the acids having the methyl group in one position and a chlorine atom in the other position ortho to the carboxyl group.

Fraction A contained 62% of monochloro-methylbenzoic acid ester, 36.5% of dichloro-methylbenzoic acid ester, and 1.5% of trichloro-methylbenzoic acid ester. This fraction was distilled and a dichloro-rich mixture, boiling point 174–175° C. at 1.3–1.1 mm., collected. This mixture was subjected to alkaline hydrolysis to form the sodium salt which was sprung with HCl. The resulting acidic mixture contained 17.1% of monochloro-methylbenzoic acid, 3.6% of trichloro-methylbenzoic acid, 72.1% of one isomer of dichloro-methylbenzoic acid, and 7.2% of a second isomer of dichloromethylbenzoic. After recrystallization from octane a relatively pure product was obtained. This recrystallized product contained 9.4% of methylchlorobenzoic acid, 3.25% of methyltrichlorobenzoic acid, 83.85% of 3,5-dichloro-2-methylbenzoic acid, and 3.5% of a material which was either 3,4-dichloro-2-methylbenzoic acid or 4,5-dichloro-2-methylbenzoic acid, or a mixture of these isomers.

Fraction B containing the di-ortho substituted acids was refluxed with $SOCl_2$ to form the corresponding benzoyl chlorides. The chlorides were distilled and a fraction, boiling point 104°–107° C. at 1.4–1.8 mm., was separated, hydrolyzed with aqueous sodium hydroxide, and converted to the acid with HCl. It was established that this product was 99.9% pure 2,3-dichloro-6-methylbenzoic acid.

*Example 8*

The pure 2,3-dichloro-6-methylbenzoic acid and the product containing 83.85% 3,5-dichloro-2-methylbenzoic acid, both prepared as described in Example 7, were tested pre-emergently and post-emergently on a variety of plants in flats. At the same time 2,3-dichlorobenzoic acid was tested. These three materials were used as aqueous solutions of the dimethylamine salts. For comparative purposes an alkanolamine salt of 2,4-dichlorophenoxyacetic acid was tested. Each of the materials was applied to the flats in an amount equivalent to the dosage amount of acid. These results are set forth in the following tables.

TABLE V.—PRE-EMERGENCE INJURY RATING

| Compound | Lbs./Acre | Co | Cl | Wh | Ot | On | Sb | Rg | Mu | Mg | Bw | Cg | Yf |
|---|---|---|---|---|---|---|---|---|---|---|---|---|---|
| 2,3-dichloro-6-methyl | 0.5 | 0 | 10 | 10 | 10 | 10 | 10 | 0 | 10 | 10 | 10 | 0 | 0 |
| | 2.0 | 10 | 10 | 10 | 10 | 10 | 10 | 10 | 10 | 10 | 10 | 0 | 0 |
| 2-methyl-3,5-dichloro | 0.5 | 0 | 0 | 0 | 0 | 0 | 0 | 0 | 10 | 0 | 0 | 0 | 0 |
| | 2.0 | 0 | 0 | 0 | 0 | 0 | 10 | 0 | 0 | 10 | 0 | 0 | 0 |
| 2,3-Dichloro | 0.5 | 0 | 0 | 0 | 0 | 0 | 8 | 0 | 10 | 0 | 0 | 0 | 0 |
| | 2.0 | 0 | 0 | 0 | 0 | 10 | 8 | 0 | 8 | 0 | 0 | 0 | 0 |
| 2,4-D | 0.5 | 0 | 5 | 10 | 0 | 8 | 8 | 0 | 10 | 10 | 10 | 0 | 0 |
| | 2.0 | 0 | 8 | 10 | 10 | 10 | 10 | 5 | 10 | 10 | 10 | 0 | 0 |
| | 4.0 | 10 | 10 | 10 | 10 | 10 | 10 | 0 | 10 | 10 | 10 | 8 | 10 |

TABLE VI.—POST-EMERGENCE INJURY RATING

| Compound | Lbs./Acre | Co | Cl | Wh | Ot | On | Sb | Rg | Mu | Mg | Bw | Cg | Yf |
|---|---|---|---|---|---|---|---|---|---|---|---|---|---|
| 2,3-dicholro-6-methyl | 0.5 | 0 | 10 | 0 | 0 | 10 | 10 | 0 | 10 | 8 | 5 | 0 | 0 |
|  | 2.0 | 0 | 10 | 0 | 0 | 10 | 10 | 0 | 10 | 10 | 10 | 0 | 0 |
| 2-methyl-3,5-dichloro | 0.5 | 0 | 0 | 0 | 0 | 0 | 0 | 0 | 0 | 0 | 0 | 0 | 0 |
|  | 2.0 | 0 | 0 | 0 | 0 | 0 | 1 | 0 | 10 | 4 | 0 | 0 | 0 |
| 2,3-dichloro | 0.5 | 0 | 0 | 0 | 0 | 5 | 0 | 0 | 8 | 0 | 0 | 0 | 0 |
|  | 2.0 | 0 | 0 | 0 | 0 | 5 | 10 | 0 | 10 | 0 | 0 | 0 | 0 |
| 2,4-D | 0.5 | 0 | 0 | 0 | 0 | 8 | 8 | 0 | 10 | 10 | 9 | 0 | 0 |
|  | 2.0 | 0 | 10 | 0 | 0 | 10 | 10 | 0 | 10 | 10 | 10 | 0 | 0 |
|  | 4.0 | 0 | 10 | 0 | 0 | 10 | 10 | 0 | 10 | 10 | 9 | 2 | 0 |

Notes:—
2,3-Dichloro-6-methyl=salt of 2,3-dichloro-6-methylbenzoic acid.
2-Methyl-3,5-dichloro=salt of 2-methyl 3,5-dichlorobenzoic acid.
2,3-Dichloro=salt of 2,3-dichlorobenzoic acid.
2,4-D=salt of 2,4-dichlorophenoxyacetic acid.
Co=Corn.  Rg=Ryegrass.
Cl=Clover.  Mu=Mustard.
Wh=Wheat.  Mg=Morning glory.
OT=Oats.  Bw=Buckwheat.
On=Onions.  Cg=Crabgrass.
Sb=Soybeans.  Yf=Yellow foxtail.
Injury Rating.—
0=No visible effect.
1, 2, 3=Indicates slight injury; plant usually recovered with little or no reduction in top growth.
4, 5, 6=Moderate injury; plant usually recovered, but with reduced top growth.
7, 8, 9=Severe injury; plants did not recover.
10=All plants killed.

In the post-emergent tests the clover and onions were planted 19 days before treatment; the mustard, crabgrass and yellow foxtail were planted 16 days before application of the herbicide; the corn, soybeans, morning glory and buckwheat were planted 12 days before treatment; and the wheat, oats, and ryegrass were planted 9 days before treatment of the flats with the compounds being tested. All observations were made 14 days after treatment.

While 2,3-dichloro-6-methylbenzoic acid and 2-methyl-3,6-dichlorobenzoic acid have been discussed in greater detail, homologues of these two acids are effective herbicides for the same purpose. The 2,3-dichloro-6-alkyl-benzoic acids and 2-alkyl-3,6-dichlorobenzoic acids may be prepared in any suitable manner. For example, 2-propyl-3,6-dichlorobenzoic acid can be prepared from ortho-bromo-toluene. When this material is nuclear dichlorinated, one of the isomers formed is 2-bromo-3,6-dichlorotoluene. The methyl group can be converted to a carboxyl group by oxidation with nitrous oxide and air. By the Fittig reaction utilizing propyl bromide in the presence of sodium metal, the bromine of the 2-bromo-3,6-dichlorobenzoic acid is replaced with a propyl group to form 2-propyl-3,6-dichlorobenzoic acid. By using methyl, ethyl or butyl bromide in place of propyl bromide, the corresponding methyl, ethyl or butyl compounds may be formed.

Propyl benzene can be monobrominated to form a mixture of o- and p-bromo propyl benzene. These isomers can be separated by distillation. Nuclear dichlorination of the ortho bromo compound will produce a mixture of 2-bromo-3,4-dichloro and 2-bromo-3,6-dichloro propyl benzene. By the Grignard reaction utilizing magnesium followed by treatment with $CO_2$ gas in the presence of water, the bromine atoms are replaced with carboxyl groups. The resulting reaction mixture contains 2-propyl-3,6-dichlorobenzoic acid and 2,3-dichloro-6-propyl benzoic acid. These acids may be separated, if desired, or used as such as herbicides. By starting with toluene, ethyl benzene or butyl benzene, the corresponding dichloro-monoalkyl benzoic acids can be formed.

We claim:

1. A compound selected from the group consisting of monoalkyldichlorobenzoic acids having the formula:

$$\text{R}-\underset{\underset{\text{Cl}}{|}}{\bigcirc}-\text{R}'\quad\text{COOH}$$

wherein one of the symbols R and R' is a chlorine atom and the other is an alkyl group containing from 1 to 4 carbon atoms; the alkali metal salts of such acids, the alkaline earth metal salts of such acids, the ammonium salts of such acids, the mono- and dialkylamine salts of such acids in which the alkyl groups contain from 1 to 4 carbon atoms, and the mono- and dialkanolamine salts of said acids; and mixtures thereof.

2. An alkali metal salt of 2,3-dichloro-6-methylbenzoic acid.

3. An alkali metal salt of 2-methyl-3,6-dichlorobenzoic acid.

4. 2,3-dichloro-6-methylbenzoic acid.

5. 2-methyl-3,6-dichlorobenzoic acid.

6. The sodium salt of 2,3-dichloro-6-methylbenzoic acid.

7. The sodium salt of 2-methyl-3,6-dichlorobenzoic acid.

8. The dimethylamine salt of 2,3-dichloro-6-methylbenzoic acid.

9. The dimethylamine salt of 2-methyl-3,6-dichlorobenzoic acid.

10. A herbicidal mixture of monomethyldichlorobenzoic acid isomers comprising 2,3-dichloro-6-methylbenzoic acid and 2-methyl-3,6-dichlorobenzoic acid.

11. A herbicidal mixture of sodium salts of monomethyldichlorobenzoic acid isomers comprising sodium 2,3-dichloro-6-methylbenzoate and sodium 2-methyl-3,6-dichlorobenzoate.

12. A mixture of methyldichlorobenzoic acids containing from 50% to 90% by weight of 2,3,6-methyldichlorobenzoic acid having a chlorine atom in the 3-position and a methyl group and a chlorine atom in the 2- and 6-positions of the ring.

References Cited by the Examiner
UNITED STATES PATENTS

| | | | |
|---|---|---|---|
| 1,858,625 | 5/1932 | Hoffa | 260—515 |
| 2,394,916 | 5/1945 | Jones | 71—2.6 |
| 2,848,470 | 8/1958 | Girard et al. | 260—515 |
| 2,992,913 | 7/1961 | Pfeiffer | 260—515 |

OTHER REFERENCES

"Chemical Abstracts," vol. 22, subject index, p. 6387, 1928.

Cohen et al., "J. Chem. Soc.," vol. 79, p. 1128 (1901).

LORRAINE A. WEINBERGER, *Primary Examiner.*

R. E. MASSA, T. L. GALLOWAY, *Assistant Examiners.*